(12) United States Patent  (10) Patent No.: US 8,224,721 B2
Seagle  (45) Date of Patent: Jul. 17, 2012

(54) LIGHTWEIGHT DUNNAGE PLATFORM

(75) Inventor: Vance L. Seagle, Henderson, NV (US)

(73) Assignee: Airdex International, Inc., Henderson, NV (US)

( * ) Notice: Subject to any disclaimer, the term of this patent is extended or adjusted under 35 U.S.C. 154(b) by 0 days.

(21) Appl. No.: 13/024,709

(22) Filed: Feb. 10, 2011

(65) Prior Publication Data

US 2011/0126740 A1  Jun. 2, 2011

Related U.S. Application Data

(63) Continuation of application No. 12/569,655, filed on Sep. 29, 2009, which is a continuation of application No. 11/675,049, filed on Feb. 14, 2007, now Pat. No. 7,689,481.

(60) Provisional application No. 60/773,454, filed on Feb. 15, 2006, provisional application No. 60/817,868, filed on Jun. 30, 2006, provisional application No. 60/817,989, filed on Jun. 30, 2006.

(51) Int. Cl.
*G06Q 10/00* (2012.01)
(52) U.S. Cl. .......................................... 705/28
(58) Field of Classification Search ...................... 705/28
See application file for complete search history.

(56) References Cited

U.S. PATENT DOCUMENTS

| 2,676,703 | A | 4/1954 | Charman |
|---|---|---|---|
| 2,893,588 | A | 7/1959 | Martin |
| 3,088,619 | A | 5/1963 | Comyn |
| 3,266,656 | A | 8/1966 | Kridle |
| 3,424,364 | A | 1/1969 | Grafslund |
| 3,511,191 | A | 5/1970 | Barry |
| 3,581,681 | A | 6/1971 | Newton |
| 3,654,012 | A | 4/1972 | Schlager |
| 3,903,023 | A | 9/1975 | Boutillier et al. |
| 4,244,411 | A | 1/1981 | Karlstrom et al. |
| 4,397,246 | A | 8/1983 | Ishida |
| 4,627,539 | A | 12/1986 | Chang et al. |
| 4,661,302 | A | 4/1987 | Park |
| 4,705,811 | A | 11/1987 | Park |

(Continued)

FOREIGN PATENT DOCUMENTS

CH  404185  12/1965

(Continued)

OTHER PUBLICATIONS

Supplemental European Search Report in connection with European Patent Application No. 07 76 3073, dated Oct. 23, 2009.

(Continued)

*Primary Examiner* — Russell S Glass
(74) *Attorney, Agent, or Firm* — Sci-Law Strategies, PC

(57) ABSTRACT

A dunnage platform adapted to support a load for transport comprises a deck including a top surface, a bottom surface and an edge extending therebetween and a pair of legs, each of the legs including at least one foot extending from the leg. The bottom surface of the deck includes at least one stub for each of the legs, the at least one stub positioning the leg along the bottom surface. The at least one foot of each leg is hollow to receive the at least one stub. When the pair of legs is positioned along the deck, the dunnage platform is elevated by the at least one foot extending from the each said leg of the pair of legs.

20 Claims, 5 Drawing Sheets

U.S. PATENT DOCUMENTS

| | | | |
|---|---|---|---|
| 4,734,441 A | 3/1988 | Park | |
| 4,796,540 A | 1/1989 | Pelfrey | |
| 5,026,321 A | 6/1991 | Benson | |
| 5,098,498 A | 3/1992 | Hale | |
| 5,156,094 A | 10/1992 | Johansson | |
| 5,266,396 A | 11/1993 | Howard | |
| 5,362,436 A | 11/1994 | Wagner | |
| 5,369,135 A | 11/1994 | Campbell | |
| 5,401,456 A | 3/1995 | Alesi, Jr. | |
| 5,417,167 A | 5/1995 | Sadr | |
| 5,492,504 A | 2/1996 | Wolters | |
| 5,525,636 A | 6/1996 | Henn | |
| 5,544,568 A | 8/1996 | Potgieter | |
| 5,555,980 A | 9/1996 | Johnston | |
| 5,598,675 A | 2/1997 | Pruss | |
| 5,601,912 A | 2/1997 | Ellingson | |
| 5,685,644 A | 11/1997 | Taylor | |
| 5,833,796 A | 11/1998 | Matich | |
| 6,021,916 A | 2/2000 | Stolzman | |
| 6,029,583 A | 2/2000 | Letrudet | |
| 6,030,158 A * | 2/2000 | Tatina et al. | 410/100 |
| 6,076,693 A | 6/2000 | Reiter | |
| 6,123,032 A | 9/2000 | Ohanesian | |
| 6,191,228 B1 | 2/2001 | Nosker | |
| 6,216,608 B1 | 4/2001 | Woods | |
| 6,224,706 B1 | 5/2001 | Matich | |
| 6,294,114 B1 | 9/2001 | Muirhead | |
| 6,380,294 B1 | 4/2002 | Babinec | |
| 6,395,791 B1 | 5/2002 | Chaudhary | |
| 6,431,372 B1 | 8/2002 | Aoyama | |
| 6,446,563 B1 | 9/2002 | Ohanesian | |
| 6,458,232 B1 | 10/2002 | Valentinsson | |
| RE38,076 E | 4/2003 | Brennan | |
| 6,622,642 B2 | 9/2003 | Ohanesian | |
| 6,659,020 B1 | 12/2003 | Ball | |
| 6,745,703 B2 | 6/2004 | Torrey | |
| 6,748,876 B2 | 6/2004 | Preisler | |
| 6,786,992 B2 | 9/2004 | Dummett | |
| 6,824,860 B2 | 11/2004 | Edwards | |
| 6,899,347 B2 * | 5/2005 | Neal et al. | 280/47.35 |
| 6,941,877 B2 | 9/2005 | Dickner | |
| 6,943,678 B2 | 9/2005 | Muirhead | |
| 6,955,129 B2 | 10/2005 | Moore | |
| 6,976,436 B1 | 12/2005 | Sugihara | |
| 6,984,695 B2 | 1/2006 | Brown | |
| 7,025,208 B2 | 4/2006 | Baker | |
| D521,208 S | 5/2006 | France | |
| 7,044,066 B1 | 5/2006 | Miller | |
| 7,128,797 B2 | 10/2006 | Dummett | |
| 7,342,496 B2 | 3/2008 | Muirhead | |
| 2002/0015811 A1 | 2/2002 | Gusavage | |
| 2002/0097282 A1 | 7/2002 | Maltseff | |
| 2002/0125090 A1 | 9/2002 | Mercado et al. | |
| 2004/0112907 A1 | 6/2004 | Donnelly | |
| 2005/0108988 A1 | 5/2005 | Dickner | |
| 2005/0128086 A1 | 6/2005 | Brown et al. | |
| 2005/0263044 A1 | 12/2005 | Bearse | |
| 2005/0274296 A1 | 12/2005 | Dickner | |
| 2006/0090844 A1 | 5/2006 | Dummett | |

FOREIGN PATENT DOCUMENTS

| | | |
|---|---|---|
| DE | 2045712 | 3/1972 |
| DE | 8429708.5 | 2/1985 |
| EP | 0422542 | 6/1990 |
| EP | 0480451 | 4/1992 |
| EP | 0520508 | 6/1992 |
| EP | 1516823 | 3/2005 |
| EP | 1500599 | 9/2007 |
| GB | 1308036 | 2/1973 |
| GB | 2375096 | 11/2002 |
| WO | 95/23682 | 9/1995 |
| WO | 02/38471 | 5/2002 |
| WO | 03/099668 | 12/2003 |
| WO | 03/099676 | 12/2003 |
| WO | 03/099689 | 12/2003 |
| WO | 2004/026713 | 4/2004 |
| WO | 2005/105590 | 11/2005 |
| WO | 2005/105599 | 11/2005 |

OTHER PUBLICATIONS

Supplemental European Search Report in connection with European Patent Application No. 07 75 7079, dated Oct. 27, 2009.

Kempfer, L., "Lighten the Load," Material Handling Management, pp. 26-31 (Aug. 2006).

* cited by examiner

LIGHTWEIGHT DUNNAGE PLATFORM

PRIORITY CLAIM

The present application is a continuation of U.S. patent application Ser. No. 12/569,655 entitled "LIGHT WEIGHT, STRONG, FIRE RETARDANT DUNNAGE PLATFORM BAG AND SYSTEM OF LOADING, DISPENSING AND USING BAG," inventor Seagle, filed Sep. 29, 2009, which is a continuation of U.S. patent application Ser. No. 11/675,049 entitled "LIGHT WEIGHT, STRONG, FIRE RETARDANT DUNNAGE PLATFORM BAG AND SYSTEM OF LOADING, DISPENSING AND USING BAG," inventors Seagle et al., filed Feb. 14, 2007, now U.S. Pat. No. 7,689,481, issued on Mar. 30, 2010, which claims the benefit of priority under 35 U.S.C. §119(e) to U.S. Provisional Patent Applications Nos. 60/773,454 entitled "LIGHT WEIGHT, STRONG, FIRE RETARDANT DUNNAGE PLATFORM BAG AND SYSTEM OF LOADING, DISPENSING AND USING BAG," inventors Seagle, et al., filed Feb. 15, 2006; Application No. 60/817,868 entitled "FREIGHT FORWARDING SYSTEM," inventors Seagle, et al., filed Jun. 30, 2006; and Application No. 60/817,989 entitled "SYSTEM FOR RETAINING LEGS ON A LIGHT WEIGHT THERMOPLASTIC DUNNAGE PLATFORM AND INSTALLING MOLDED LEGS ON A DUNNAGE PLATFORM DECK," inventor Vance L. Seagle, filed Jun. 30, 2006. These applications are herein expressly incorporated by reference in their entireties.

CROSS-REFERENCE TO RELATED APPLICATION

This application is related to the following application:
U.S. patent application Ser. No. 11/672,863, entitled "MODULAR, KNOCK-DOWN, LIGHT WEIGHT, THERMALLY INSULATING, TAMPER PROOF SHIPPING CONTAINER AND FIRE RETARDANT SHIPPING BAG," inventors Seagle, et al., filed Feb. 8, 2007, which application is herein expressly incorporated by reference in its entirety.

FIELD OF THE INVENTION

This invention is in the general field of a modified dunnage platform assembled from a dunnage platform base and legs attached to the base.

BACKGROUND OF THE INVENTION

The adoption of International Standardized Phytosanitary Monitoring (ISPM)-15 for wood packaging material (WPM) requires kiln dry treatment of all wood used in shipping crates and dunnage platforms (pallets). The United States in cooperation with Mexico and Canada began enforcement of the ISPM 15 standard on Sep. 16, 2005. The North American Plant Protection Organization (NAPPO) strategy for enhanced enforcement will be conducted in three phases. Phase 1, Sep. 16, 2005 through Jan. 31, 2006, call for the implementation of an informed compliance via account managers and notices posted in connection with cargo that contains noncompliant WPM. Phase 2, Feb. 1, 2006 through Jul. 4, 2006, calls for rejection of violative crates and pallets through re-exportation from North America. Informed compliance via account managers and notices posted in cargo with other types of non-compliant WPM continues to remain enforce. Phase 3, Jul. 5, 2006, involves full enforcement on all articles of regulated WPM entering North America. Non-compliant regulated WPM will not be allowed to enter the United States. The adoption of ISPM-15 reflects the growing concern among nations about wood shipping products enabling the importation of wood-boring insects, including the Asian Long horned Beetle, the Asian Cerambycid Beetle, the Pine Wood Nematode, the Pine Wilt Nematode and the Anoplophora Glapripwnnis.

Thus the wooden dunnage platform has become unattractive for the international shipment of products. Further, the wooden surface is not sanitary since it potentially can harbor in addition to insects, mould and bacteria. Thus, the wooden crate is generally ill-suited for the shipment of foodstuffs and other produce requiring sanitary conditions.

Plastic dunnage platforms or pallets are known, see U.S. Pat. No. 3,915,089 to Nania, and U.S. Pat. No. 6,216,608 to Woods et al., which are herein incorporated by reference in their entirety. Plastic pallet manufacturing techniques typically involve injection molding, which significantly increases the cost of the plastic pallets. In order to justify this initial investment cost of the plastic pallet, the pallet must be extensively re-used. Thus, while the plastic surface of the plastic pallet obviates some of the sanitary problems with wood pallets, because of the required repetitive use the surface can become unsanitary. As a consequence when used for the shipment of foodstuffs and other produce requiring sanitary conditions, the high cost of the plastic pallet requires that the plastic surface be cleaned and kept clean prior to use.

Some wood pallet manufacturers have attempted to produce a more sanitary surface by combining foam with wooden surfaces. These dunnage platforms still suffer a number of disadvantages including their weight, the presence of wood requiring kiln treatment and the possibility of the foam being stripped away to expose the wood surface.

Thermoplastic molded dunnage platforms are known. U.S. Pat. No. 5,833,796 to Dummett, which is herein incorporated by reference in its entirety, which discloses applying thermoplastic sheets to a preformed rigid structure for manufacturing dunnage platforms.

Irrespective of the material used to make the dunnage platform sanitary, there remains a problem in the field of keeping sanitary dunnage platforms clean while they are being stored or otherwise not in use.

Optiledge™ feet are lightweight, strong, phytosanitary, molded feet in an L-shape designed to attach to the bottom of a crate or shipping unit and which can act as a transport device. Optiledge™ can in some circumstances be used as an alternative to a wood pallet for loading and shipping units. When the product to be shipped contains a deck, Optiledge™ can be made integral to the packaged product and can act as a pallet during the storage and distribution of the packaged product. Optiledge™ or any similar device is not appropriate when the unit load does not include a deck surface onto which the Optiledge™ type device can be mounted.

SUMMARY OF THE INVENTION

In one embodiment of the invention, a dunnage platform with damaged feet is modified such that the feet can be removed and replacement feet can be attached. In an embodiment of the present invention, the damaged feet of a dunnage platform can be removed and Optiledge™ feet can be attached to the dunnage platform deck. In another embodiment of the invention, a dunnage platform deck with stubs is manufactured and molded feet are press fitted into the stubs or otherwise attached to the dunnage platform deck. In various embodiments of the invention, the modified dunnage platforms can be loaded into the dunnage platform bag.

This summary is not intended to be a complete description of, or limit the scope of, the invention. Other embodiments of methods for manufacturing a dunnage platform and repairing the legs of damaged dunnage platforms, within the spirit and scope of the invention, can be understood by a person having ordinary skill in the art. Alternative and additional features, aspects, and objects of the invention can be obtained from a review of the specification, the figures, and the claims.

DETAILED DESCRIPTION OF THE INVENTION

Figure 1:
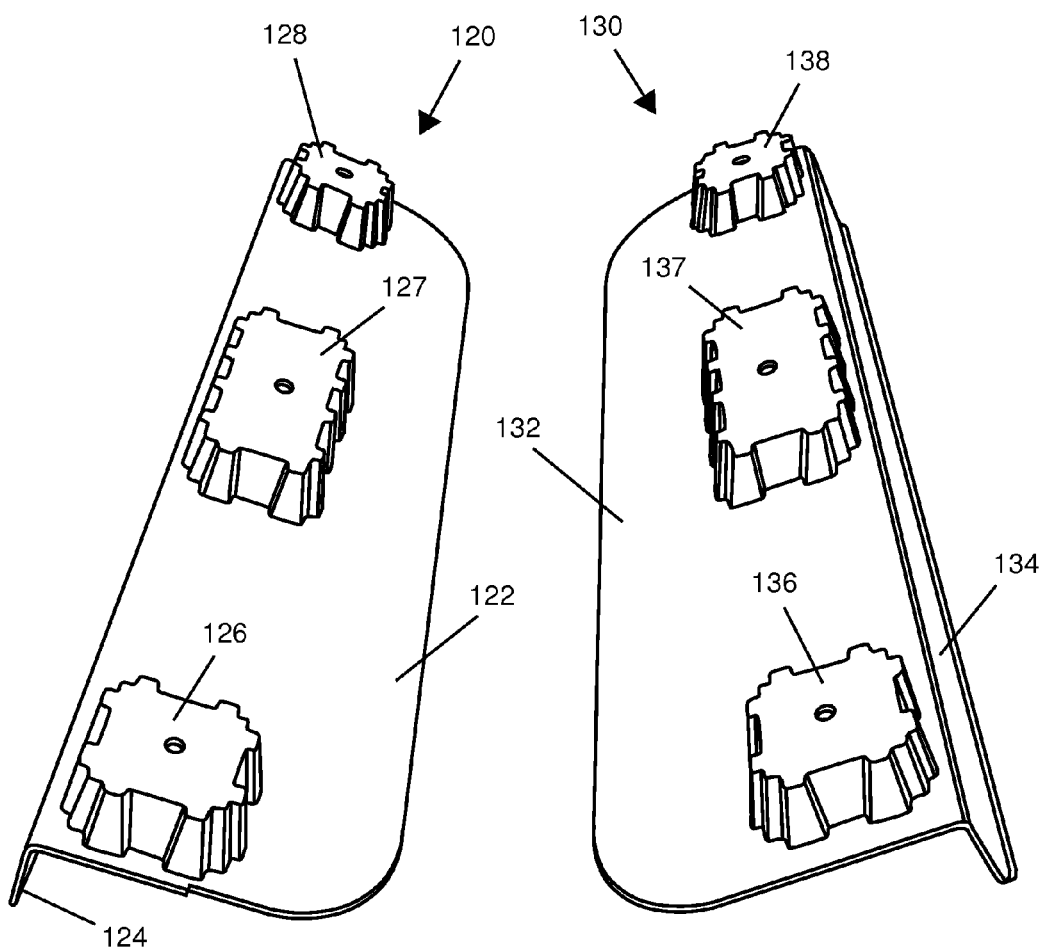
FIG. 1 shows a pair of inverted Optiledge™ high density polyethylene legs suitable for attachment onto a thermoplastic dunnage platform deck.
Figure 2:
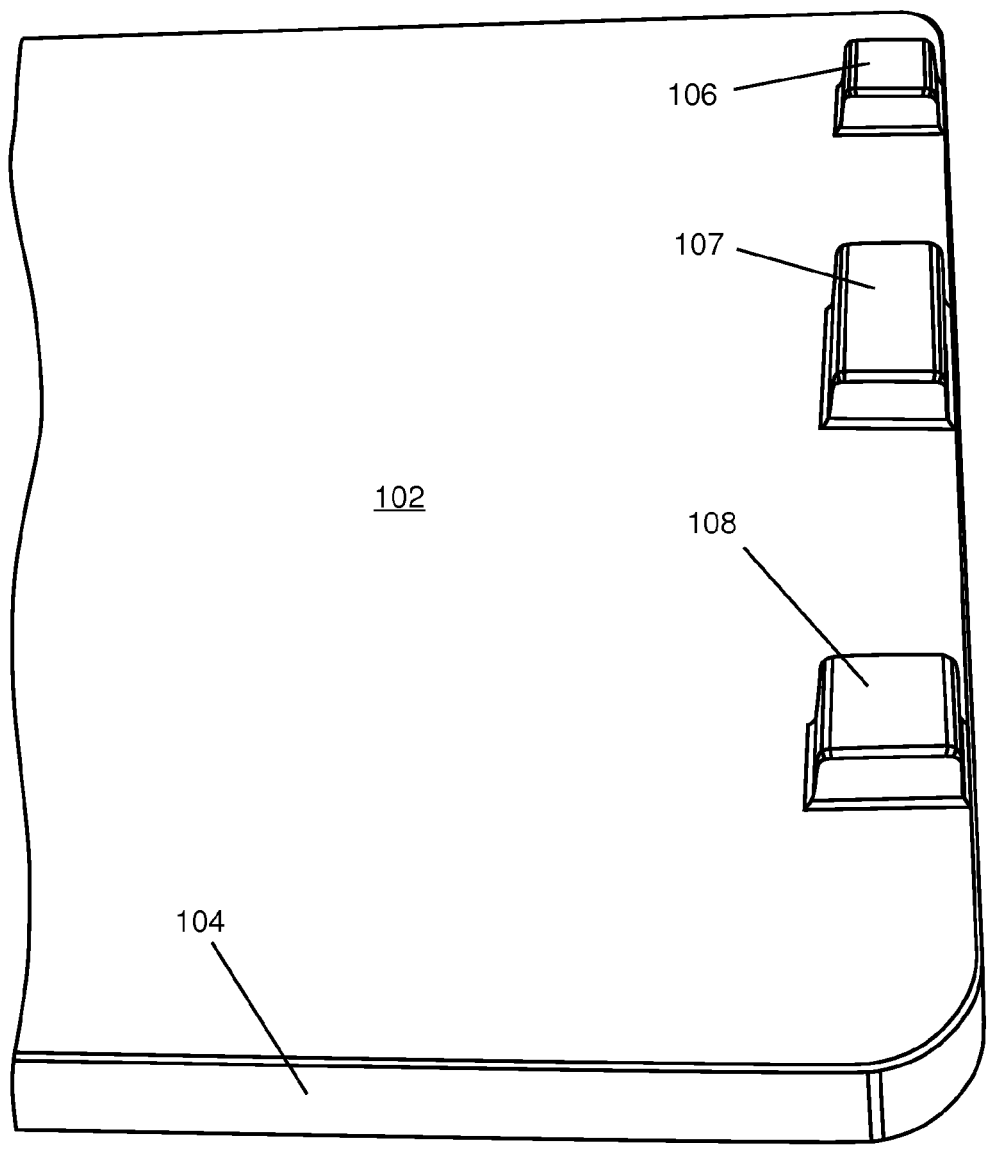
FIG. 2 shows the bottom side of a thermoplastic dunnage platform deck with stub-leg inserts attached.
Figure 3:
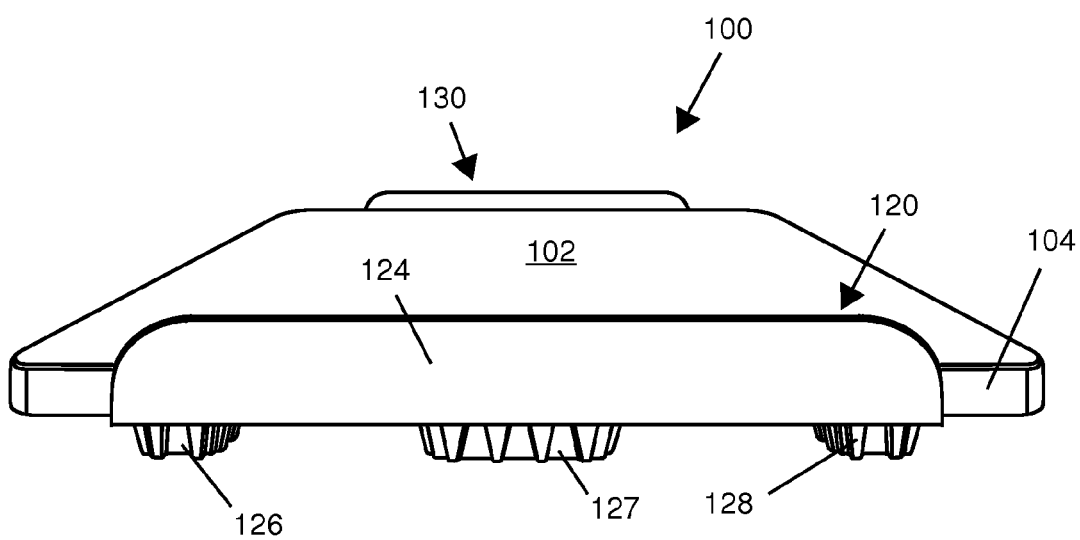
FIG. 3 shows a side view of the Optiledge™ high density polyethylene legs attached to a thermoplastic dunnage platform deck.
Figure 4:
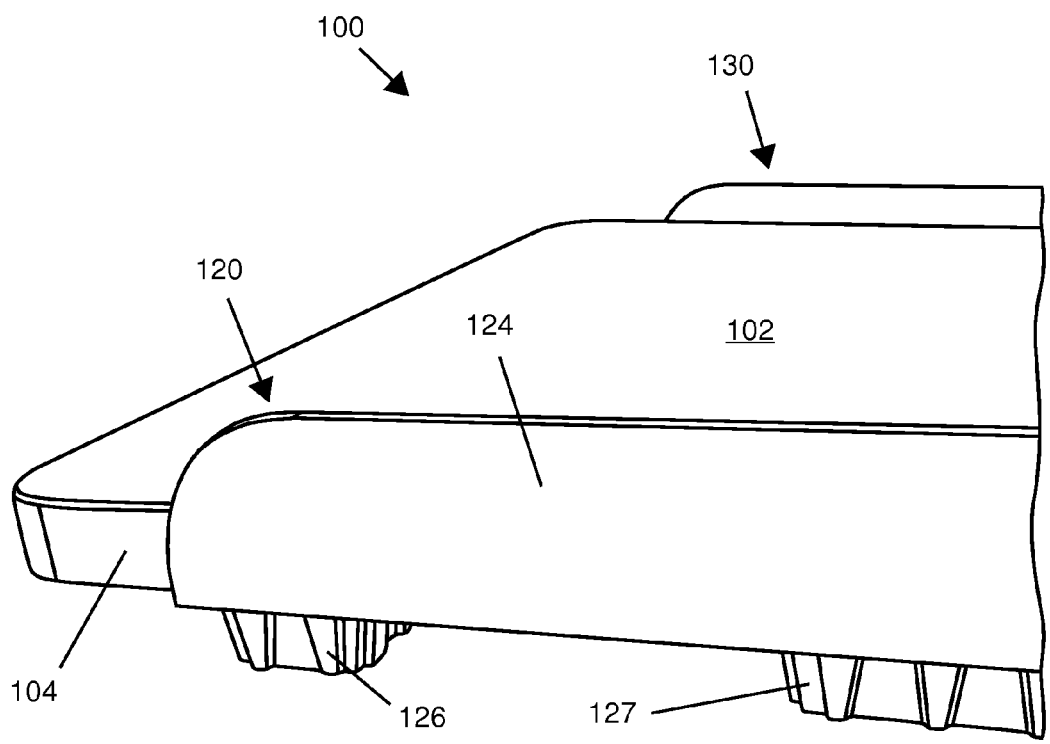
FIG. 4 shows the edge of the Optiledge™ high density polyethylene legs abutting the edge of the thermoplastic dunnage platform deck.
Figure 5:
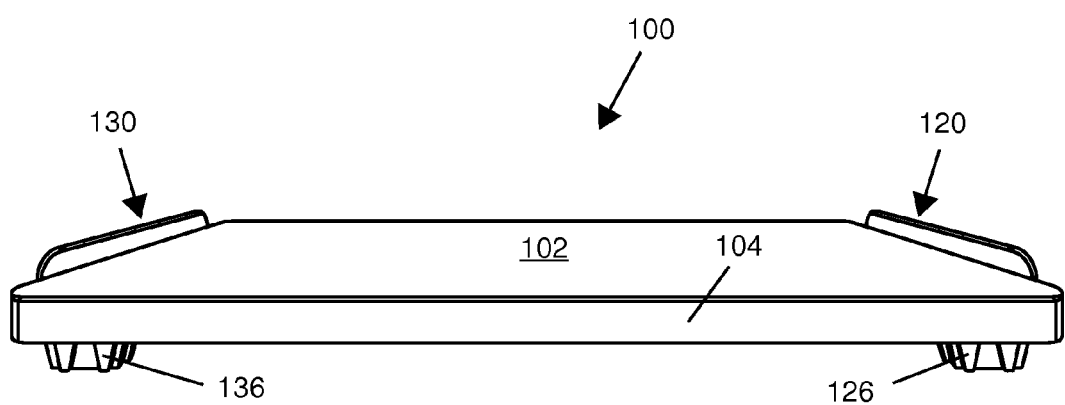
FIG. 5 shows a frontal view of the Optiledge™ high-density polyethylene legs attached to a thermoplastic dunnage platform deck.

In an embodiment of the present invention, the damaged feet of a dunnage platform can be removed and molded feet can be attached to the legless dunnage platform deck. Optiledge™ feet have been designed to be integral with the deck of cargo and then the deck, cargo and Optiledge™ feet can be strapped together. FIG. 1 shows a pair of Optiledge™ feet 120, 130. When a dunnage platform is damaged, all the feet can be removed using a band saw or other suitable cutting device to remove the damaged feet thereby generating a thermoplastic dunnage platform deck. In an embodiment of the present invention, leg stubs can be attached to the thermoplastic dunnage platform deck. The leg stubs in the dunnage platform base can be generated by cutting up damaged thermoplastic dunnage platforms. In an alternative embodiment, the leg stubs can be affixed to the thermoplastic dunnage platform deck using molding. The leg stubs can also be attached using other means of adhering or affixing. Once affixed to the thermoplastic dunnage platform deck 102 the leg stubs 106, 107, 108 appear as shown in FIG. 2. The leg stubs 106, 107, 108 can be used to locate a lightweight, strong, phytosanitary, molded feet in an L-shape designed to attach to the bottom of a deck 102. In an embodiment of the present invention the leg stubs 106, 107, 108 can be used to attach to Optiledge™ feet 120, 130. By applying suitable force the molded (Optiledge™) feet 120, 130 can be press fitted into the leg stubs 106, 107, 108. Once affixed the thermoplastic dunnage platform deck 100 appears as shown in FIGS. 3-5. Shown in FIG. 4, the L shaped section 124, 134 of the Optiledge™ feet 120, 130 is abutting the edge 104 of the thermoplastic dunnage platform deck 102. In FIGS. 1 and 4 the 'L' shaped molded feet 120, 130 can be made up of a first and a second member 122, 124, 132, 134, which can be joined to form the 'L' shape. The hollow feet 126, 127, 128, 136, 137, 138 extend from one of the first or second members 120, 130. The hollow feet 126, 127, 128, 136, 137, 138 can be press fitted into the leg stubs 106, 107, 108 shown in FIG. 2.

Alternatively, a third leg can be added in between the two molded feet to provide additional support for the thermoplastic dunnage platform deck and cargo. By using molded feet without the L shaped retainer (or by removing the L-shaped section of the Optiledge™ feet), the molded feet can be applied to a flat surface. By affixing leg stubs in the center of the thermoplastic dunnage platform deck, and placing leg stubs in the center position an additional set of legs can be placed at any position under the deck.

In an alternative embodiment of the present invention, a thermoplastic dunnage platform with one or more damaged feet can be modified such that one or more of the damaged feet can be removed and one or more replacement feet can be attached in the location of the removed feet.

In an embodiment of the present invention, thermoplastic dunnage platforms in which the feet have been damaged can be collected at a point of destination shipping location. The feet of the thermoplastic dunnage platforms can be removed and the thermoplastic dunnage platforms decks can be stored in a flame retardant bag. Once the bag is filled the bag with the thermoplastic dunnage platforms decks can be shipped to a desired point of origin shipping location. Separately, or together molded feet can be shipped to the same location. Alternatively, the damaged thermoplastic dunnage platforms can be shipped to a desired point of origin shipping location and the legs can be removed at this location. Also at this location, one or more stub feet can be affixed to the thermoplastic dunnage platform deck and the molded feet can be affixed by press fitting into the stub legs. Alternative means of assembling molded feet onto the thermoplastic dunnage platform deck can be envisaged by one of ordinary skill in the art. Cargo can then be loaded on the assembled thermoplastic dunnage platforms with molded feet, strapped and shipped to the desired location.

In one embodiment of the invention, a shipping container bag is disclosed that is light weight, strong, made of a fire retardant material and which forms an ultra violet (UV) light reflective, weather-proof and dust particle barrier to protect the integrity of the shipping container. The expression 'UV light reflective' indicates that no more than 2% of either UV-A, UV-B or UV-C light is transmitted through the bag material. The term 'weather-proof' indicates that the bag is substantially impenetrable to water, in as much as less than 5% of 2.5 mm (1 inch) of rainfall at or below Beaufort scale 4 wind will accumulate within the bag in the form of moisture or residue at an ambient temperature of 25° C. (77° F.) and humidity of less than 80%. The shipping container bag can be used to store the shipping container, when not in use. The shipping container bag can be used to enclose the shipping container. The shipping container bag can be used to store transport and/or dispense one or more shipping containers. Alternatively, the shipping container bag can be used to store transport and/or dispense one or more knocked down shipping containers. It is understood that a person having ordinary skill in the art can tailor the dimensions of the shipping container bag to suit the number of shipping container bags to be stored and/or the configuration, knocked-down or assembled, of the containers to be stored.

In one embodiment of the invention, the bag is made of one or more materials selected from the group consisting of Low Density Polyethylene (LDPE), High Density Polyethylene (HDPE) and polypropylene (PP). In another embodiment of the invention, the bag is made of flame retardant material. In an embodiment of the invention, the bag is made from polyethylene, aromatic bromine and antimony trioxide. In one embodiment of the invention, the bag is made of one or more of the following materials: LDPE, HDPE and PP and treated with ARX 501 FR 05 LD. In an embodiment of the invention, the bag meets standards DIN 4102 B2, DIN 4102 B1 and CEE. In a further embodiment of the invention, the bromine additive is heat stable up to 350° C.

In various embodiments of the invention, the shipping container base, top panel and walls are made of a polymer core covered with a thermoplastic sheet. In various embodiments of the invention, the polymer core and thermoplastic sheet can be chemically combined. In one embodiment of the invention, the shipping container base, top panel and walls are made of an Expandable Polystyrene (PSE) core chemically combined with High Impact Polystyrene sheets (HIPS). Because of a chemical combination of components, comparing the core before the chemical combination to the shipping container material that is formed, there is an increase in strength to weight ratio of as much as 1000:1 when using PSE chemically combined with HIPS.

In various alternative embodiments of the invention, the core material can be a blend of polyphenylene ether (PPE) and polystyrene (PS) impregnated with pentane, a blend of polyyphenyene ether (PPE) and polystyrene (PS) impregnated with pentane or polyethylene (PE) and Polypropylene.

In various alternative embodiments of the invention, the thermoplastic sheets used to cover the core can be either polypropylene/polypropylene composite, Polycarbonate (PC), Low Density Polyethylene (LDPE), High Density Polyethylene (HDPE), Polypropylene (PP), Acrylonitrile Butadiene Styrene (ABS) and Polyphony Ether alloyed with High Impact Polystyrene. Many of these thermoplastic sheets have desirable properties when the shipping container design requires a living hinge or other flexible properties.

In one embodiment, a compressible core member is introduced and sandwiched between a first heated thermoplastic sheet. Subsequently, the reverse side of the core member is sandwiched between a second heated thermoplastic sheet. The join between the two thermoplastic sheet surfaces can then be cut and welded to seal the outer surface of the light weight shipping container material. By welding the join between the two thermoplastic sheets the resulting product can be sealed so as to prohibit the collection of organic matter and thereby inhibit the growth of bacteria, mold and parasites. In an alternative embodiment, the first sheet is applied to the first surface of the core and then when the second sheet is to be applied, the edge of the first sheet is heated to allow the second sheet to be applied to the second surface of the core and at the same time welded to the first sheet applied to the edges of the core.

In another embodiment, a compressible core member is stacked or sandwiched between two heated thermoplastic sheets. The sandwich is compressed and corresponding portions of the two sheets contact one another and bond together. The core member bonds to the interior surface of the thermoplastic shell as the core member tries to expand and contacts portions of the other thermoplastic sheet.

In another embodiment of the invention, a Radio Frequency IDentification (RFID) tag is imbedded in one or more of: the spreader, the transporter base frame, the dispenser base, the reloading base and the material of the four walls. In one embodiment of the invention, the RFID tag operates using an Ultra High Frequency (UHF) signal. In another embodiment of the invention, the RFID tag operates using a microwave frequency signal.

In an embodiment of the present invention, a RFID tags can be inserted into the exposed polystyrene core after the damaged legs have been removed and prior to affixing the stub legs. In an embodiment of the present invention, a RFID reader mounted in the bag used to collect the thermoplastic dunnage platform decks can then read the RFID tags in the individual dunnage platforms. In an embodiment of the invention, the RFID reader in the bag and the RFID tag in the thermoplastic dunnage platform decks can be positioned so that the RFID tag antenna is least affected by any conducting material in the dunnage platform legs or dunnage platform bag.

In one embodiment, the RFID tag is centered in the middle of the spreader, the transporter base, the dispenser base, the reloading base and the material of the four walls. In another embodiment, the RFID tag is placed on the edge of the spreader, the transporter base, the dispenser base, the reloading base and the material of the four walls. In an embodiment of the invention, the RFID tag can be positioned so that the RFID tag antenna is least affected by the metal in the dunnage platform bag and base.

In one embodiment the RFID tag is read only. In another embodiment, the RFID tag contains an Electrically Erasable Programmable Read-Only Memory (EPROM), which enables both read and write functions. In an embodiment of the invention, the RFID tag is passive. In another embodiment of the invention, the RFID tag is semi passive containing a source of energy such as a battery to allow the tag to be constantly powered. In a further embodiment of the invention, the RFID tag is active, containing an internal power source, such as a battery, which is used to power any Integrated Circuits (ICs) in the tag and generate the outgoing signal. In another embodiment, the tag has the ability to enable location sensing through a photo sensor.

In an embodiment of the invention, the cargo and each dunnage platform contain a passive RFID tag and each dunnage platform bag contains an active RFID tag and RFID tag reader. Each dunnage platform bag is able to monitor the cargo and the dunnage platforms loaded in the dunnage platform bag. In a shipment, one or more master dunnage platform bag contains an RFID tag reader which is able to monitor all the other dunnage platform bags in the vicinity of the master dunnage platform bag. The master dunnage platform is then able to relay the position and condition of the entire shipment to a base station.

In one embodiment of the invention, means of communication with a base station is imbedded in the dunnage platform bag in one or more of the spreader, the transporter base, the dispenser base, the reloading base and the material of the four walls. In an alternative embodiment of the invention, one or more dunnage platforms loaded in the dunnage platform bag contain the apparatus to communicate with the base station in order to relay the condition and global position of the cargo.

In one embodiment of the invention, the communication means utilizes one or more of a wireless local area network; a wireless wide area network; a cellular network; a satellite network; a Wi-Fi network; and a pager network. In one embodiment of the invention, the device embedded is a modem capable of communicating with one or more of the aforementioned networks. In the following discussion the term 'cellular modem' will be used to describe the device embedded. The term 'cellular modem' will be herein used to identify any device of comparable size capable of communicating over one or more of the aforementioned networks. In one embodiment of the invention, the cellular modem can be a Code Division Multiple Access (CDMA) modem. In an embodiment of the invention, a RFID reader and associate integrated circuit processor can be embedded together with the cellular modem in the spreader, the transporter base, the dispenser base, the reloading base and the material of the four walls. In such an embodiment, the RFID tags and RFID reader can be positioned to optimize the RFID read of the RFID tags from the other surfaces, which make up the dunnage platform bag.

In an embodiment of the invention, where a RFID reader and a cellular modem can be embedded in one or more of the spreader, the transporter base, the dispenser base, the reloading base and the material of the four walls; the RFID reader is in communication with one or more RFID readers, associated cellular modems and the RFID tags of one or more dunnage platform bags in the vicinity of the RFID reader. Through communications with the RFID reader and associated integrated circuit processor of the plurality of dunnage platform bags in the vicinity, a RFID reader and associated integrated circuit processor is able to distinguish the RFID tag from dunnage platforms loaded in the bag and dunnage platforms loaded in dunnage platform bags in the vicinity based on one or more of location, strength of signal, variation of RFID tag signal with position in the dunnage platform bag relative to the reader, variation of RFID tag signal with time and prior input data. In an embodiment of the invention, one or more antenna inserted into the material of the bag can be used to help discriminate the location of the dunnage platforms loaded in a dunnage platform bag. In an embodiment of the invention, the RFID reader and associate processor can be in communication with the embedded cellular modem. In an embodiment of the invention, the cellular modem is in communication with a base station and can transmit one or more parameters selected from the group consisting of one or more RFID tag location, one or more RFID tag identification code, number of dunnage platforms loaded in the bag, dunnage platform bag information, previous shipment information, dunnage platform condition, dunnage platform bag condition and time stamp.

In one embodiment of the invention the RFID code uses the IEEE format and is Electronic Product Code (EPC) readable. In another embodiment of the invention the RFID code uses the UCC format and is Universal Product Code (UPC) readable. In another embodiment, the format is compatible for EPC, European Article Number (EAN) and UPC read and write functions.

Various embodiments can be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention can also be implemented by the preparation of integrated circuits and/or by interconnecting an appropriate network of component circuits, as will be readily apparent to those skilled in the art.

Various embodiments include a computer program product which is a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission can include a plurality of separate transmissions.

Stored on one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software can include, but is not limited to, device drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers and remote software to do the function. The invocations or calls can include invocations or calls in distributed and client/server systems.

The invention claimed is:

1. A dunnage platform adapted to support a load for transport comprising:
    a deck including a top surface, a bottom surface and an edge extending therebetween;
    a pair of legs, each of the legs including at least one foot extending from the leg;
    wherein the bottom surface of the deck includes at least one stub for each of the legs, the at least one stub positioning the leg along the bottom surface;
    wherein when the pair of legs is positioned along the deck, the dunnage platform is elevated by the at least one foot extending from the each said leg of the pair of legs; and
    wherein the at least one foot of each leg is hollow to receive the at least one stub.

2. The dunnage platform of claim 1, wherein each of the legs is "L"-shaped and includes a first member that abuts the bottom surface and from which the at least one foot extends and a second member that abuts the edge.

3. The dunnage platform of claim 2, wherein the second member extends above the top surface of the deck.

4. The dunnage platform of claim 2, wherein each leg of the pair of legs is positioned at opposite intersections of the edge and the bottom surface.

5. The dunnage platform of claim 4, further comprising:
    a third leg arranged between the pair of legs, the third leg having a flat shape and including at least one foot extending from the third leg;
    wherein the at least one foot that extends from the third leg is hollow; and
    wherein the bottom surface of the deck includes at least one stub that is received by the at least the one hollow foot of the third leg.

6. The dunnage platform of claim 1, wherein, the at least one stub is press fit into the foot of each of the pair of legs.

7. The dunnage platform of claim 1, wherein the at least one stub for each of the legs is a registration feature and is located to guide each said leg of the pair of legs into a position along the bottom surface.

8. The dunnage platform of claim 1, wherein each of the legs includes two or more feet extending from the leg, the two or more feet being spaced and having a sufficient height and adapted to accommodate prongs of a forklift being positioned to apply a lifting force to the bottom surface of the deck.

9. The dunnage platform of claim 1, wherein the pair of legs are removable from the deck.

10. The dunnage platform of claim 1, wherein the at least one stub is integrally formed with the deck.

11. The dunnage platform of claim 1, wherein the at least one stub is separately formed from the deck and secured to the bottom surface of the deck.

12. The dunnage platform of claim 1, wherein:
   each leg of the pair of legs includes three hollow feet spaced along the respective leg;
   the pair of legs mirror each other; and
   the at least one stub for each of the legs is inserted within at least one of the hollow feet to position each of the pairs of legs on the bottom surface.

13. The dunnage platform of claim 1, wherein:
   each said foot of each said leg of the pair of legs is hollow;
   the pair of legs mirror each other; and
   each said stub is inserted within the respective hollow foot to position each said leg of the pair of legs on the bottom surface.

14. A reusable system adapted to transport cargo comprising:
   a dunnage platform adapted to support a load to be transported including a deck and a pair of legs;
   wherein the deck has a top surface, a bottom surface and an edge extending therebetween, and the bottom surface includes at least one stub to position each of the legs;
   wherein the pair of legs each includes at least one hollow foot extending from the respective leg;
   wherein the at least one hollow foot of each leg can receive at least one said stub; and
   a storage structure; and
   wherein the pair of legs is disconnected from the deck and the deck is placed in the storage structure when the dunnage platform is prepared for delivery to a location for reuse.

15. The system of claim 14, wherein the storage structure is a dunnage platform bag; and wherein the dunnage platform bag is capable of receiving a plurality of dunnage platforms.

16. The system of claim 14, wherein the storage structure is a shipping container; and wherein the shipping container is capable of receiving a plurality of dunnage platforms.

17. A dunnage platform adapted to support a load for transport comprising:
   a deck including a top surface, a bottom surface and an edge extending therebetween;
   a pair of legs, wherein each said leg of the pair of legs including at least one hollow foot extending from the leg;
   wherein the bottom surface of the deck includes a stub for each of the hollow feet, the stub being positioned within a corresponding foot; and
   wherein when the pair of legs is positioned along the deck, the dunnage platform is elevated by the feet of the pair of legs.

18. A dunnage platform adapted to support a load for transport comprising:
   a deck including a top surface, a bottom surface and an edge extending therebetween;
   a pair of legs, each of the legs being L-shaped with a first surface contacting the bottom surface of the deck and a second surface contacting the edge of the deck, each said leg of the pair of legs further including three hollow feet spaced along and extending from the first surface of the leg;
   wherein the bottom surface of the deck includes a stub for each of the hollow feet, each said stub being positioned within a corresponding foot; and
   wherein when the pair of legs is positioned along the deck, the dunnage platform is elevated by the feet of the pair of legs.

19. A dunnage platform adapted to support a load for transport comprising:
   a deck including a top surface, a bottom surface and an edge extending therebetween;
   a pair of legs connectable with the deck, each of the legs being L-shaped with a first surface contacting the bottom surface of the deck and a second surface contacting the edge of the deck, each of the legs further including three feet spaced along and extending from the first surface of the leg; and
   wherein when the pair of legs is connected with the deck, the dunnage platform is elevated by the feet of the pair of legs.

20. The dunnage platform of claim 19, wherein the second surface of each said leg of the pair of legs extends above the top surface of the deck.

* * * * *